United States Patent Office 3,690,864
Patented Sept. 12, 1972

3,690,864
HERBICIDAL COMPOSITION AND METHOD
Philip C. Hamm, Glendale, and Angelo John Speziale, Creve Coeur, Mo., assignors to Monsanto Company, St. Louis, Mo.
No Drawing. Original application Nov. 20, 1967, Ser. No. 684,494, now Patent No. 3,557,210, dated Jan. 19, 1971. Divided and this application May 6, 1970, Ser. No. 47,932
Int. Cl. A01n 9/20
U.S. Cl. 71—118
12 Claims

ABSTRACT OF THE DISCLOSURE 2-haloacetamides of the formula

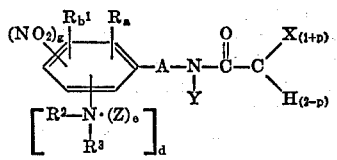

wherein X is halogen (Cl, Br, F and I), p is an integer from 0 to 2 inclusive, A is alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen (Cl, Br, F and I), $b$ is an integer from 0 to 3, $R^2$ and $R^3$ are selected from the group consisting of hydrogen and alkyl of not more than 4 carbon atoms, $e$, $d$ and $g$ are each integers from 0 to 1, Z is an acid forming a phytotoxic acid addition salt, and Y is selected from the group consisting of hydrogen, alkyl, alkenyl, alkynyl, phenyl and cinnamyl of not more than 12 carbon atoms. Utility as phytotoxicants.

---

This application is a division of copending application Ser. No. 684,494, filed Nov. 20, 1967, now U.S. Pat. 3,557,210.

This invention relates to novel 2-haloacetamides which are useful as pre-emergent phytotoxicants. This invention further relates to phytotoxic compositions and to methods of controlling the growth of plants.

The term "phytotoxicant" as used herein and in the appended claims means materials which (1) effectively control all plants in a given locus or (2) selectively control the growth of one or more plant species in the presence of other plants. In like manner, "phytotoxic" and "phytotoxicity" are used to identify the overall and selective control activity of the compounds and compositions of this invention.

The term "plant" as used herein and in the appended claims is inclusive of dormant seeds, germinant seeds, germinative seeds and emerging seedlings.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The 2-haloacetamides of this invention are represented by the formula

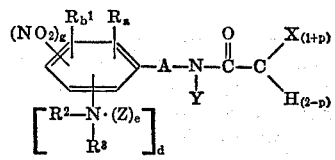

wherein X is halogen (Cl, Br, F and I), p is an integer from 0 to 2 inclusive, A is alkenylene of at least 3 and not more than 6 carbon atoms, R is selected from the group consisting of alkyl, alkenyl and alkoxy of not more than 4 carbon atoms, $a$ is an integer from 0 to 5, $R^1$ is halogen (Cl, Br, F and I), $b$ is an integer from 0 to 3, $R^2$ and $R^3$ are selected from the group consisting of hydrogen and alkyl of not more than 4 carbon atoms, $e$, $d$ and $g$ are each integers from 0 to 1, Z is an acid forming a phytotoxic acid addition salt, and Y is selected from the group consisting of hydrogen, alkyl, alkenyl, alkynyl, phenyl and cinnamyl of not more than 12 carbon atoms.

In the above formula R can be alkyl such as methyl, ethyl, n-propyl, isopropyl, n-butyl, sec-butyl, isobutyl and tert-butyl, alkenyl such as vinyl, allyl, n-butenyl-1 and n-butenyl-2, and alkoxy such as methoxy, ethoxy, propoxy, butoxy and isobutoxy. The alkyl of $R^2$ and $R^3$ can be those listed above for R.

The alkenylene of A can be, for example, propenylene, butenylene, isopropenylene, pentenylene and the like.

Representative Y radicals for the 2-haloacetamides of this invention include hydrogen, alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologues and isomers of alkyl of not more than 12 carbon atoms, alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl of not more than 12 carbon atoms, alkynyl such as propargyl, butynyl, pentynyl and the various homologues and isomers of alkynyl of not more than 12 carbon atoms, phenyl, phenylalkyl such as benzyl, phenylethyl, 4-phenylbutyl and the like and cinnamyl.

Acids which can be used in the preparation of the phytotoxic acid addition salts of the above 2-haloacetamides include, for example, inorganic acids such as hydrochloric acid, hydrobromic acid, sulfuric acid, phosphoric acid, nitric acid, and the like and organic acids such as acetic acid, trichloroacetic acid, benzoic acid, 2,4-dinitrobenzoic acid, succinic acid, tartaric acid, phthalic acid, and the like.

In the above formula Z is preferably an inorganic acid such as HCl and HBr.

The 2-haloacetanilides of this invention can be prepared by haloacetylation of suitable substituted or unsubstituted phenylalkenyl amines. The haloacetylating agent is preferably either a haloacetic anhydride, such as chloroacetic anhydride, or a haloacetyl halide, such as chloroacetyl chloride, bromoacetyl bromide, or the like. The choice of haloacetylating agent is determined to some extent by the nature of the ortho substitution of the phenylalkenylamine to be acetylated. Thus, the haloacetic anhydride is ordinarily used with a difficultly acetylated amine but it is usually preferred to use a haloacetyl halide to acetylate the more reactive amines.

The haloacetylation reaction is preferably conducted in the presence of a suitable organic medium. The organic medium must be anhydrous if the acetylating agent is a haloacetic anhydride. However, either anhydrous media or media containing water can be used with haloacetyl halide acetylating agents. Suitable organic media for use with either acetylating agent include, for example, benzene, diethyl ether, hexane, methylethyl ketone, chlorobenzene, toluene, chloroform, and the xylenes. Preferably an acid acceptor is present in the reaction zone to neutralize the acid formed. Suitable acid acceptors for anhydrous systems include the aromatic amine reactants, which can be present in the reaction zone in an amount greater than that required for the acetylation, tertiary amines and pyridine. Acid acceptors in aqueous systems include alkali or alkaline earth hydroxides and alkali or alkaline earth metal carbonates or bicarbonates.

The haloacetylation reaction is generally carried out at temperatures below room temperature, and is preferably carried out in the range of from about 0° C. to about 15° C. The reaction is preferably carried out at atmospheric pressure although sub-atmospheric pressure and super-atmospheric pressure can be used. Although haloacetylation can be carried out using equimolar amounts of reactants, it is preferred that from 2 to 5% of an excess of the acetylating agent be used. The acetanilide products can be separated from the reaction mixture by methods well known to those skilled in the art, for example, distillation or fractional crystallization from the reaction medium or from solvents.

While the present 2-haloacetamides are useful as fungicides, bactericides, bacteriostats and fungistats, their most outstanding characteristic is the control of plant growth. In accordance with this invention it has been found that the growth of dormant seeds, germinant seeds, germinative seeds and emerging seedlings can be controlled by exposing the seeds and emerging seedlings to the action of a phytotoxic amount of the 2-haloacetamides of the present invention. The 2-haloacetanilides can be used as individual compounds, as admixtures of two or more compounds, or in admixture with an adjuvant. These compounds are effective as general pre-emergent phytotoxicants, but their most outstanding utility is as selective pre-emergent phytotoxicants, e.g. the selective control of the growth of one or more monocotyledonous species and/or one or more dicotyledonous species in the presence of other monocotyledons and dicotyledons. Furthermore these compounds are characterized by broad spectrum activity; i.e. they modify the growth of a wide variety of plants including but not limited to ferns, conifers (pine, fir and the like), monocotyledons and dicotyledons.

For the sake of brevity and simplicity, the term "active ingredient" will be used hereinafter to describe the present 2-haloacetanilides.

The compositions of this invention contain at least one active ingredient and an adjuvant in liquid or solid form. The compositions are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided solid, a liquid of organic origin, water, a wetting agent, a dispersing agent, an emulsifying agent or any suitable combination of these.

Typical finely-divided carriers and extenders for the compositions of this invention include by way of example the talcs, clays, pumice, silica, diatomaceous earth, walnut flour, chalk, quartz, fuller's earth, salt, sulfur, powdered cork, powdered wood, charcoal, ground corn cobs, illite clay, tobacco dust, volcanic ash, cottonseed hulls, wheat flour, soybean flour, tripoli and the like. Typical liquid diluents include water, kerosene, Stoddard solvent, hexane, toluene, benzene, acetone, ethylene dichloride, xylene, alcohols, Diesel oil, glycols and the like.

The compositions of this invention, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The term "phytotoxic composition" as used herein and in the appended claims is intended to mean not only compositions in a suitable form for application but also concentrated compositions which require dilution or extension with a suitable quantity of liquid or solid adjuvant prior to application.

The following examples will illustrate the invention. In the following examples as well as in the specification and appended claims, parts and percent are by weight unless otherwise indicated.

EXAMPLE 1

A reaction vessel was charged with 1 mole of N-isopropyl-N-cinnamylamine, 2000 ml. of chloroform and 2 mols of sodium carbonate. Thereafter, 1.2 mole of chloroacetyl chloride was added slowly with stirring over a period of 30 minutes while maintaining the temperature below 10° C. At the end of this time, the oil layer formed was separated and washed first with 300 ml. of 3% hydrochloric acid and then twice with warm water. The solvents were removed by evaporation at reduced pressure and the syrup obtained was crystallized from heptane and then dilute methanol to give N-isopropyl-N-cinnamyl-2-chloroacetamide having a boiling point of 187–195° C. at a pressure of 2–3 mm. of Hg. Analysis of this product gave 14.11% chlorine which is the same as the calculated value for chlorine.

The following 2-haloacetamides of this invention were prepared by the same or similar procedures as in Example 1 above.

Example: Compound and properties
2 ———— N - n - butyl - N - cinnamyl - 2 - chloroacetamide B.P.: 200° C. at 1 mm. of Hg. Chlorine—Calc'd: 13.37%. Found: 13.68%.
3 ———— N - n - hexane - N - cinnamyl - 2 - chloroacetamide B.P.: 207–215° C. at 3–4 mm. of Hg. Chlorine—Calc'd: 12.09%. Found: 12.15%.
4 ———— N - (4 - methoxycinnamyl) - 2 - chloroacetamide B.P.: 185–190° C. at 0.5–1 mm. of Hg. Chlorine—Calc'd: 15.85%. Found: 15.99%.
5 ———— N - (4 - chlorocinnamyl) - 2 - chloroacetamide B.P.: 80:85° C. at 1 mm. of Hg. $n_D^{20}=1.536$.
6 ———— N - (3,4 - dichlorocinnamyl) - 2 - chloroacetamide B.P.: 136–144° C. at 2 mm. of Hg. $n_D^{20}=1.5555$.
7 ———— N,N - dicinnamyl - 2 - chloroacetamide. Chlorine — Calc'd: 10.9%. Found: 11.5%.
8 ———— N - (4 - t - butylcinnamyl) - 2 - chloroacetamide. Chlorine—Calc'd: 13.34%. Found: 13.89%.
9 ———— N - (4 - dimethylaminocinnamyl) - 2-chloroacetamide. Chlorine — Calc'd: 12.26%. Found: 12.28%.

The pre-emergent plant growth regulant activity of illustrative 2-haloacetamides of this invention is demonstrated as follows:

A good grade of top soil is placed in aluminum pans and compacted to a depth of ⅜" to ½" from the top of each pan. A predetermined number of seeds of each of various plant species are placed on top of the soil in each pan. The phytotoxic compositions are applied to the soil by two methods: (1) application to the surface of the top soil layer and (2) admixture with or incorporation in the top soil layer.

In the surface application method the seeds are covered with a ⅜" layer of prepared soil and the pan leveled. The phytotoxic composition is applied by spraying the surface of the top layer of soil, prior to watering the seeds, with a solution containing a sufficient amount of active ingredient to obtain the desired rate per acre on the soil surface.

In the soil incorporation method, the soil required to cover the seeds is weighed and admixed with a phytotoxic composition containing a known amount of active ingredient. The pans are then filled with the admixture and leveled. Watering is carried out by permitting the soil in the pans to absorb moisture through the apertured bottom of the pans. The seed containing pans are placed on a wet sand bench and maintained for approximately 14 days under ordinary conditions of sunlight and watering.

The plants are observed at the end of approximately 14 days and the results recorded.

The pre-emergent phytotoxic activity of the active ingredients is measured by the average percent control of each seed lot. The average percent control is converted to a relative numerical scale for the sake of brevity and simplicity in the examples. The pre-emergent phytotoxic activity index used in Table I is defined as follows:

| Average percent control: | Numerical scale |
|---|---|
| 0–25 | 0 |
| 26–50 | 1 |
| 51–75 | 2 |
| 76–100 | 3 |

The pre-emergent phytotoxic activity of some of the 2-haloacetanilides of this invention is recorded in Table I for various application rates of the active ingredients in both surface and soil-incorporation applications. The terms "SA" and "SI" in the Comments column of Table I mean surface application method and soil incorporation method; respectively. In Table I the various plant species are represented by letters as follows:

| | |
|---|---|
| A—General Grass | I—Foxtail |
| B—General Broadleft | J—Crab Grass |
| C—Morning Glory | K—Pigweed |
| D—Wild Oats | L—Soybean |
| E—Brome Grass | M—Wild Buckwheat |
| F—Rye Grass | N—Tomato |
| G—Radish | O—Sorghum |
| H—Sugar Beets | | extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylinic glycols, polyoxyethylene derivatives of alkylphenols (particularly isooctylphenol and nonylphenol) and polyoxyethylene derivatives of the mono-higher fatty acid esters of hexitol anhydrides (e.g. sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total composition. Where required from about 0.1 to 2.0 parts by weight of the solid inert extender can be replaced by a corrosion inhibitor or anti-foaming agent or both.

Aqueous suspensions can be prepared by mixing to-

TABLE I.—PRE-EMERGENT PYHTOTOXIC ACTIVITY

| | Comments | Application rate, lb./acre | A | B | C | D | E | F | G | H | I | J | K | L | M | N | O |
|---|---|---|---|---|---|---|---|---|---|---|---|---|---|---|---|---|---|
| N-cinnamyl-2-chloroacetamide | SI | 5 | 3 | 0 | 0 | 2 | 3 | 3 | 0 | 0 | 3 | 3 | 3 | 0 | 0 | 0 | 3 |
| N-methyl-N-cinnamyl-2-chloroacetamide | SI | 5 | 3 | 0 | 0 | 1 | 3 | 3 | 0 | 0 | 3 | 3 | 2 | 1 | 0 | 0 | 3 |
| N-p-methylcinnamyl-2-chloroacetamide | SA | 5 | 2 | 0 | 0 | 1 | 1 | 1 | 1 | 0 | 3 | 3 | 2 | 0 | 0 | 0 | 2 |
| N-o-methylcinnamyl-2-chloroacetamide | SA | 5 | 1 | 0 | 0 | 0 | 1 | 1 | 1 | 0 | 3 | 3 | 0 | 0 | 0 | 0 | 0 |
| N-(2,6-dichlorocinnamyl)-2-chloroacetamide | SA | 5 | 2 | 0 | 0 | 0 | 2 | 2 | 0 | 0 | 3 | 3 | 1 | 0 | 3 | 0 | 0 |
| N-(2,6-diiodocinnamyl)-2-chloroacetamide | SA | 5 | 2 | 1 | 0 | 1 | 3 | 2 | 0 | 1 | 3 | 3 | 3 | 0 | 1 | 0 | 0 |
| N-(p-n-butylcinnamyl)-2-chloroacetamide | SA | 5 | 3 | 0 | 0 | 0 | 3 | 3 | 0 | 0 | 3 | 3 | 3 | 2 | 0 | 0 | 1 |
| N-(p-chlorocinnamyl)-2-chloroacetamide | SA | 5 | 3 | 0 | 0 | 2 | 2 | 2 | 0 | 0 | 3 | 3 | 0 | 0 | 0 | 0 | 3 |
| N-(3,4-dichlorocinnamyl)-2-chloroacetamide | SA | 5 | 2 | 0 | 0 | 0 | 1 | 2 | 0 | 0 | 3 | 3 | 1 | 0 | 0 | 0 | 2 |
| N-isopropyl-N-cinnamyl-2-chloroacetamide | SA | 5 | 3 | 0 | 0 | 0 | 1 | 3 | 0 | 0 | 3 | 3 | 0 | 1 | 0 | 0 | 3 |
| N-(n-butyl)-N-cinnamyl-2-chloroacetamide | SA | 5 | 1 | 0 | 0 | 0 | 0 | 0 | 0 | 0 | 3 | 3 | 0 | 0 | 0 | 0 | 1 |
| N-(p-methoxycinnamyl)-2-chloroacetamide | SA | 5 | 2 | 0 | 0 | 3 | 0 | 1 | 0 | 0 | 3 | 3 | 0 | 1 | 0 | 0 | 1 |
| N,N-dicinnamyl-2-chloroacetamide | SA | 5 | 1 | 0 | 1 | 0 | 1 | 1 | 0 | 0 | 2 | 3 | 0 | 0 | 0 | 1 | 0 |

As mentioned hereinbefore the phytotoxic compositions of this invention comprise an active ingredient and one or more adjuvants which can be solid or liquid extenders, carriers, diluents, conditioning agents and the like. Preferred plant growth regulant compositions containing the active ingredients of this invention have been developed so that the active ingredients can be used to the greatest advantage to modify the growth of plants. The preferred compositions comprise wettable powders, aqueous suspensions, dust formulations, granules, emulsifiable oils and solutions in solvents. In general, these preferred compositions can all contain one or more surface-active agents.

Surface-active agents which can be used in the phytotoxic compositions of this invention are set out, for example, in Searle U.S. Pat. 2,426,417, Todd U.S. Pat. 2,655,447, Jones U.S. Pat. 2,412,510 and Lenher U.S. Pat. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general, less than 50 parts by weight of the surface active agent is present per 100 parts by weight of phytotoxic composition.

Wettable powders are water-dispersible compositions containing one or more active ingredients, an inert solid gether and grinding an aqueous slurry of water-insoluble active ingredient in the presence of dispersing agents to obtain a concentrated slurry or very finely-divided particles. The resulting concentrated aqueous suspension is characterized by its extremely small particle size, so that when diluted and sprayed coverage is very uniform.

Dusts are dense finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterizd by possessing relatively low surface areas and are poor in liquid absorption. Suitable inert solid extenders for plant growth regulant dusts include micaceous talcs, pyrophyllite, dense kaolin clays, ground calcium phosphate rock and tobacco dust. The dusts usually contain from about 0.5 to 95 parts active ingredients, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkylol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surface active agent and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate, vermiculite, and the finely-divided clays such as kaolin clays, hydrated attapulgite or bentonitic clays. These extenders are sprayed or blended with the active ingredient to form the phytotoxic granules.

The mineral particles which are used in the granular phytotoxic compositions of this invention usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the present granular composition. The term "mesh" as used herein means U.S. Sieve Series.

The granular phytotoxic compositions of this invention generally contain from about 5 parts to about 30 parts by weight of 2-haloacetanilide per 100 parts by weight of clay and 0 to about 5 parts by weight of surface active agent per 100 parts by weight of particulate clay. The preferred phytotoxic granular compositions contain from about 10 parts to about 25 parts by weight of active ingredient per 100 parts by weight of clay.

The phytotoxic compositions of this invention can also contain other additaments, for example fertilizers, other phytotoxicants, plant growth regulants, pesticides and the like used as adjuvants or in combination with any of the above-described adjuvants. Chemicals useful in combination with the active ingredients of this invention include for example triazines, ureas, carbamates, acetamides, acetanilides, uracils, acetic acids, phenols, thiolcarbamates, triazoles, benzoic acids, nitriles and the like such as:

3-amino-2,5-dichlorobenzoic acid
3-amino-1,2,4-triazole
2-methoxy-4-ethylamino-6-isopropylamino-n-triazine
2-chloro-4-ethylamino-6-isopropylamino-a-triazine
2-chloro-N,N-diallylacetamide
2-chloro-N-isopropylacetanilide
2-chloroallyl diethyldithiocarbamate
N'-(4-chlorophenoxy) phenyl-N,N-dimethylurea
isopropyl M-(3-chlorophenyl)carbamate
2,2-dichloropropionic acid
S-2,3-dichloroallyl N,N-diisopropylthiolcarbamate
2-methoxy-3,6-dichlorobenzoic acid
2,6-dichlorobenzonitrile
6,7-dihydrodipyrido(1,2-a:2',1'-c)-pyrazidinium salt
3-(3,4-dichlorophenyl)-1,1-dimethylurea
4,6-dinitro-o-sec-butylphenol
2-methyl-4,6-dinitrophenol
ethyl N,N-dipropylthiolcarbamate
2,3,6-trichlorophenylacetic acid
5-bromo-2-isopropyl-6-methyluracil
3-(3,4-dichlorophenyl)-1-methoxy-1-methylurea
2-methyl-4-chlorophenoxyacetic acid
3-(p-chlorophenyl)-1,1-dimethylurea
1-butyl-3-(3,4-dichlorophenyl)-1-methylurea
N-1-naphthylphthalamic acid
1,1'-dimethyl-4,4'-bipyridinium salt
2-chloro-4,6-bis(isopropylamino)-s-triazine
2-chloro-4,6-bis(ethylamino)-s-triazine
2,4-dichlorophenyl-4-nitrophenyl ether
$\alpha,\alpha,\alpha$-trifluoro-2,6-dinitro-N,N-dipropyl-p-toluidine
S-propyl dipropylthiocarbamate
2,4-dichlorophenoxyacetic acid
2',6'-diethyl-N-methoxymethyl-2-chloroacetanilide Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the 2-haloacetamides are dispersed in or on soil or plant growth media in any convenient fashion. Application to the soil or growth media can be carired out by simply admixing with the soil, by applying to the surface of the soil and thereafter dragging or discing into the soil to the desired depth, or by employing a liquid carrier to accomplish the penetration and impregnation. The application of liquid and particulate solid phytotoxic compositions to the surface of soil can be carried out by conventional methods, e.g. power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the plant growth regulants.

The application of an effective amount of the 2-haloacetamides of this invention to the soil or growth media is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific 2-haloacetamide employed. In applications to soil for the modification of the growth of germinant seeds, germinative seeds and emerging seedlings the active ingredients are applied in amounts from about 0.001 to about 25 or more pounds per acre, In such soil applications, it is desirable that the active ingredients be distributed to a depth of at least 0.2 inches. In selective pre-emergence phytotoxic applications the active ingredients are usually applied in amounts from about 0.001 to 5 pounds per acre. It is believed that one skilled in the art can readily determine from the teachings of this specification, including examples, the approximate application rate for any situation.

The terms "soil" and "growth media" are employed in the present specification and claims in their broadest sense to be inclusive of all conventional "soils" as defined in Webster's New International Dictionary, Second edition, unabridged (1961). Thus, the terms refer to any substance or media in which vegetation may take root and grow, and are intended to include not only earth but also compost, manure, muck, humus, sand and the like, adapted to support plant growth.

Although the invention is described with respect to specific modifications, the details thereof are not to be construed as limitations except to the exent indicated in the following claims.

The embodiments of the invention in which an exclusive property or privilege is claimed are defined as follows:

1. Composition comprising an adjuvant and a phototoxic amount of at least one compound of the formula

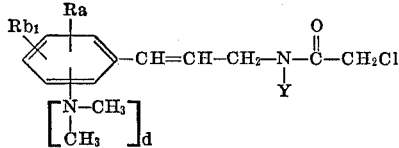

wherein Y is selected from the group consisting of hydrogen, alkyl having a maximum of six carbon atoms and cinnamyl; R is selected from the group consisting of alkyl having a maximum of four carbon atoms and methoxy; R' is halogen; $a$ is an integer 0 to 1; $b$ is an integer 0 to 2; and $d$ is an integer 0 to 1.

2. Method which comprises pre-emergently exposing plants to a phytotoxic amount of a compound of the formula

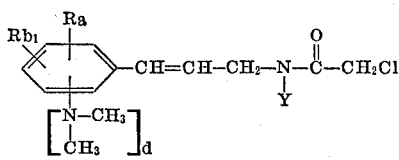

wherein Y is selected from the group consisting of hydrogen alkyl having a maximum of six carbon atoms and cinnamyl; R is selected from the group consisting of alkyl having a maximum of four carbon atoms and methoxy; R' is halogen; $a$ is an integer 0 to 1; $b$ is an integer 0 to 2; and $d$ is an integer 0 to 1.

3. Composition of claim 1 wherein Y is hydrogen and $d$ is zero.

4. Composition of claim 1 wherein Y is alkyl and $d$ and $b$ are zero.

5. Composition of claim 1 wherein $b$ and $d$ are zero and R and Y are alkyl.

6. Composition of claim 1 wherein $a$ and $d$ are zero, $R^1$ is chlorine and $b$ is one.

7. Composition of claim 1 wherein $a$ and $b$ are zero.

8. Composition of claim 1 wherein R is alkyl.

9. Composition of claim 1 wherein the compound is N-cinnamyl-2-chloroacetamide.

10. Composition of claim 1 wherein the compound is N-(4'-butyl-cinnamyl)-2-chloroacetamide.

11. Composition of claim 1 wherein the compound is N-(p-chlorocinnamyl)-2-chloroacetamide.

12. Composition of claim 1 wherein the compound is N-isopropyl-N-cinnamyl-2-chloroacetamide.

References Cited

UNITED STATES PATENTS

| | | | |
|---|---|---|---|
| 2,577,969 | 12/1951 | Jones | 71—118 |
| 3,141,758 | 7/1964 | Hamm et al. | 71—115 X |

OTHER REFERENCES

Almirante et al.: Antibiotics and Chemotherapy, vol. x, pp. 667–70 (1960).

Rapoport et al.: Moskouskoe Obschchestuo Ispytatelet Pinody, Biulletin Otedel Biologicheskii, vol. 70, pp. 117–29 (1965).

JAMES O. THOMAS, JR., Primary Examiner

U.S. Cl. X.R.

71—92, 93, 94, 100, 105, 111, 113, 115, 117, 120, 121, 122, 124